Nov. 8, 1955 E. LABIN 2,723,376

ELECTRICAL DELAY DEVICES

Filed June 27, 1951

INVENTOR
EMILE LABIN
BY Percy P. Lantzy
ATTORNEY

United States Patent Office 2,723,376

Patented Nov. 8, 1955

2,723,376

ELECTRICAL DELAY DEVICES

Emile Labin, New York, N. Y., assignor to International Telephone and Telegraph Corporation, a corporation of Maryland Application June 27, 1951, Serial No. 233,900

11 Claims. (Cl. 332—7)

The present invention relates generally to electrical delay devices and more particularly to improvements in electronic devices which include a long path for flow of electrons.

Two general types of delay devices are available at the present time to obtain small predetermined time delays for electrical signals, particularly pulsed electrical signals. One type utilizes the well known property of a liquid or a solid medium of transmitting a pressure wave at a reduced speed. The wave is impressed on one end of the medium and picked up at the other end, or the wave is reflected and picked up at the input end. Such delay lines have not, however, been used to any great extent as they are costly to manufacture and are generally easily damaged. The other type of delay device utilizes electrical impedance components and generally takes the form of a ladder network comprising lumped constants. Whenever appreciable delays are to be obtained, such ladder networks tend to become complex, bulky, and costly to manufacture. In both types, the delay characteristic is fixed and cannot easily be modified to meet specific requirements, such as a variable or adjustable delay or a specific modification of the transmitted wave shape. It is contemplated by the present invention to provide improved electronic delay means having among other advantages, flexibility both as to the amount of delay attained and as to the effect of the delay device upon the impressed wave.

Accordingly, one object of the present invention is to provide a simple and effective electronic device which is capable of providing selected time delays.

Another object is to provide an electronic device in which the amount of delay obtained may be modulated by one or more signals for signal mixing or multiplication of signals.

Another object is to provide an electronic device in which the wave shape of the transmitted signal may be modified.

Still another object is to provide an electronic device having a flow of electrons whereby the flow intensity may be modulated by one or more signals and also the transit time of the flow may be modulated by one or more signals.

A still further object is to provide an electronic device in which signal transit time may be varied so as to compress the transmitted signal into a shorter time interval.

The foregoing and other objects and features of the present invention will appear more fully hereinafter from the detailed description which follows taken together with the accompanying drawing wherein specific embodiments of the invention are illustrated by way of example. It is to be understood, however, that the drawing is for the purpose of illustration and description only and is not intended as a definition of the limits of the invention.

For a better understanding of the operation of the electronic device illustrated, some of the fundamental theories of the behavior of electrons when acted upon by various electric and magnetic forces will first be considered.

Electrons when acted upon by even a small potential difference will travel at a high velocity. In order to obtain an appreciable and useful delay of a pulse by merely modulating an electron stream, an extremely long electron path would be required. For this reason it has been considered impracticable to obtain a useful delay by utilizing the electron transit time. In accordance with the present invention, means are provided whereby the necessary length of the electron path is provided within the confines of relatively small enclosures, thereby making it practicable to modulate a stream of electrons and then obtain an appreciable delay before the modulation will arrive at the collector electrode.

It is known that electrons which are subjected to mutually perpendicular, or crossed, magnetic and electric fields are caused to traverse a trochoidal path with a rate of progression along the axis of the trochoid determined by the strength of the fields and the initial velocity of the electrons. If, for instance, an electron is injected into mutually perpendicular electric and magnetic fields of which the electric field has a value of ten volts per centimeter and the magnetic field a value of 1000 gauss, the electron will progress in a direction at right angles to both fields, that is to say, in the direction of the axis of the cycloid, at an average speed of 1 cm. per microsecond. A delay of 10 microseconds can, therefore, be obtained within a total physical length of approximately 10 cm. By varying either the electric or the magnetic field, or both, the speed of propagation of the electrons and hence the total transit time thereof may be varied and the delay caused by a device having a fixed length may be effectively controlled.

Figure 1:
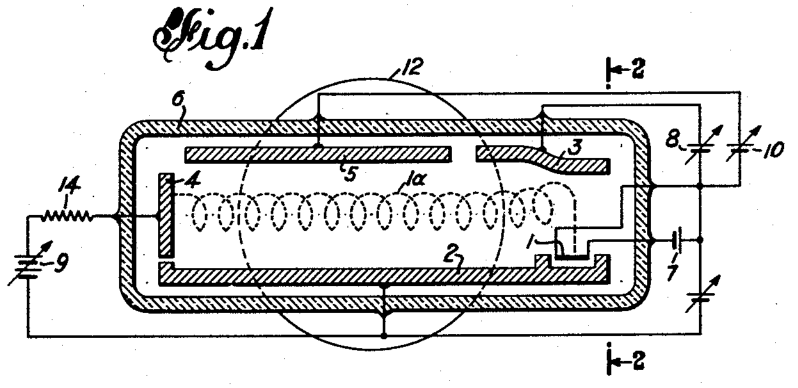
Fig. 1 is a diagram partly in cross section of a device in accordance with the invention.
Figure 2:
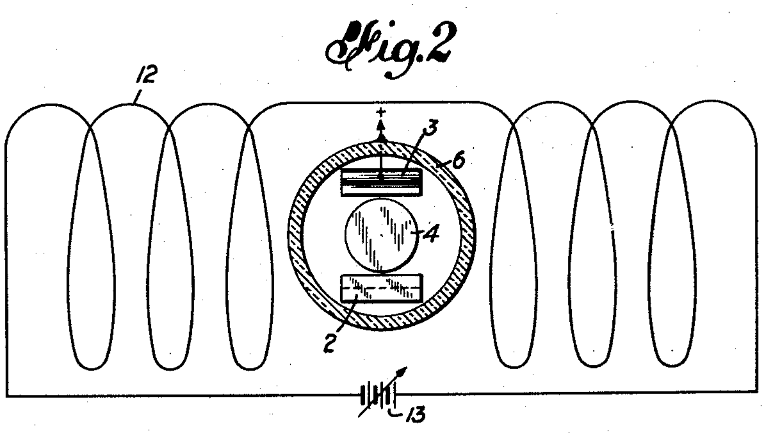
Fig. 2 is a diagram showing a cross sectional view of the device taken along line 2—2 of Fig. 1.

A suitable device for accomplishing this result in accordance with the invention is illustrated in its elementary form in Figs. 1 and 2 and comprises a source of electrons or cathode 1, a rail electrode 2, an anode 3, a collector electrode 4 and a control electrode 5. The electrode assembly is preferably enclosed within an evacuated enclosure, such as a glass envelope 6. Suitable sources of bias potentials, shown as batteries, are applied to the electrodes. In the device shown in Fig. 1, the cathode 1 is energized by voltage source 7 and may be considered as being at the reference potential. The biases applied by voltage sources 8, 9 and 10 to electrodes 3, 4, and 5 respectively, are positive and are made variable to afford a simple means for changing the operating characteristics of the device as required. Rail electrode 2 is biased negatively by variable voltage source 11.

In the absence of interfering fields, electrons emitted from cathode 1 will normally flow to anode 3 and be collected thereby. If now an electric field is established across the gap between the rail electrode 2 and control electrode 5, which electrodes preferably comprise parallel elongated metallic plates as shown, and if a magnetic field is established perpendicular to this electric field, i. e. normal to the path between cathode 2 and collector electrode 4 and normal to the paper as viewed in Fig. 1, for example by a helical coil 12 energized from a source of D. C. current 13 shown in Fig. 2, the electrons will flow toward collector electrode 4 in a trochoidal path 1*a*. This phenomenon is described in detail in U. S. Patent No. 2,513,260 to Alfven et al., June 27, 1950. The base line, or axis, of the trochloidal path 1*a* will follow substantially an equipotential plane in the field between between electrodes 2 and 5 of Fig. 1, as explained in the U. S. patent referred to, and reference is particularly made to Figs. 1 to 3 and the description contained in columns 5 to 9 of this patent for a theoretical explanation of the behavior of electrons subjected to crossed electric and magnetic fields. The device disclosed by the Alfven et al. patent is provided with a plurality of collector electrodes and with means for selectively deflecting the electron stream from one collector electrode to the other in order to provide an electronic selector particularly suitable for use in automatic telephone systems.

The device according to the present invention utilizes an electronic stream following a trochoidal path in the manner described in the Alfven patent to provide a highly efficient time delay device. It will be apparent that the path actually traveled by an electron will increase in length as the circular movement thereof is axially compressed or the diameter thereof is increased. For a fixed relative potential between the cathode 1, anode 3, and collector electrode 4, the length of the electron path may be controlled by varying either the magnetic field or the electric field between electrodes 2 and 5, or both. It has been found more convenient, however, to vary the strength of the electric field, i. e. the potential applied to control electrode 5 with respect to the rail electrode 2.

The fact that the delay produced by the device can be controlled throughout the electron path makes it possible to alter the time scale of transmitted periodic signals at will. Thus if we assume, for example, that a series of periodic pulses are applied to a control electrode near the cathode to modulate the electron stream accordingly, and that a saw-tooth voltage of appropriate period and slope is simultaneously applied to the speed control electrodes (i. e. the electrodes establishing the electric or magnetic fields), then the output current in load 14 will be in the form of a series of pulses crowded into a fraction of the period of the original series of pulses. In other words, the device may, for example, be utilized to increase the number of channels in a time division multiplex telephone system by a predetermined desired amount. Furthermore, the device is effective to change the wave shape of the periodic voltage at will, and is useful for correcting for non-linearity in the scanning voltage of a television system, for example, or for introducing other predetermined correction factors therein.

Generally speaking, any signal which can be expressed as a function of time $F(t)$ will be transmitted without distortion if it travels through a delay device which introduces a constant delay D. The output signal then becomes $F(t+D)$. The wave shape is conserved as long as D is a constant, but if D is also a function of time, then the signal can be transformed in a manner not heretofore possible. By applying signal controlled delay variations to a carrier modulated electron beam, the carrier may be phase or frequency modulated.

The magnitude of output current developed in the load 14 connected in the collector circuit will depend upon the space charge surrounding cathode 1. In the modification shown in Fig. 3, a grid 15 is provided adjacent the cathode 16, the electron flow can be effectively controlled. To produce timing modulation, such as phase or frequency modulation, the electron stream is amplitude modulated by carrier wave voltages impressed on the grid 15 by the source 17 or on anode 18 by the source 19, and signal voltages are impressed on the control electrode 20 by the source 21. The signal voltages from the source 21 vary the transit time of the electrons and accordingly vary the amount of delay. The output voltages appearing across the load 14 are, then, carrier wave voltages whose phase or frequency is modulated in accordance with the signal impressed on the control electrode 20. If source 17 supplies a series of positive pulses to the grid 15, and the grid 15 is biased to cut-off by voltage source 22 and potentiometer 23, the electron stream will consist solely of a series of pulses as indicated at 16*a*. The electron stream may be pulse modulated also by impressing pulses on anode 18 by source 19. The output voltage across the load 14 will then be a series of similar pulses, but having intervals therebetween varying in accordance with the signals impressed by the source 21.

The electron stream may be used as a vehicle for mixing or multiplying signals, the electron stream being modulated by a first signal impressed on anode 18 by a source of signals 19, and by a second signal impressed on the grid 15 from a source of signals 17, and a mixed delayed signal product will appear across the load 14. The outputs of voltage sources 17, 19 and 21 may have any desired form, for example, they may be A. C. voltages or pulses.

In order to crowd a signal into a fraction of its original period as mentioned above, a linear saw tooth voltage may be developed in source 21 to vary the potential of electrode 20 in accordance therewith, and another signal, which may be in the form of a series of pulses having a higher repetition frequency than said saw tooth voltage, is applied either to the grid 15 or to the anode 18 to modulate the electron stream.

The control of the delay time may be facilitated by causing the rate of drift of the electrons toward the collector electrode 24 to vary along the electron path. One way of varying the drift velocity of the electrons is to provide a plurality of control electrodes 20, 20*a*, Fig. 3, in place of the single control electrode 5 shown in Fig. 1, and supplying the control electrodes 20, 20*a* with different potentials from the sources 10, 10*a*. The drift velocity of the electrons may be varied also by making the magnetic field non-homogeneous along the electron path. This may be done by providing a magnet 25, which may be a permanent magnet or an electromagnet, having a field which is more intense in one region of the tube than in another region.

Figure 3:
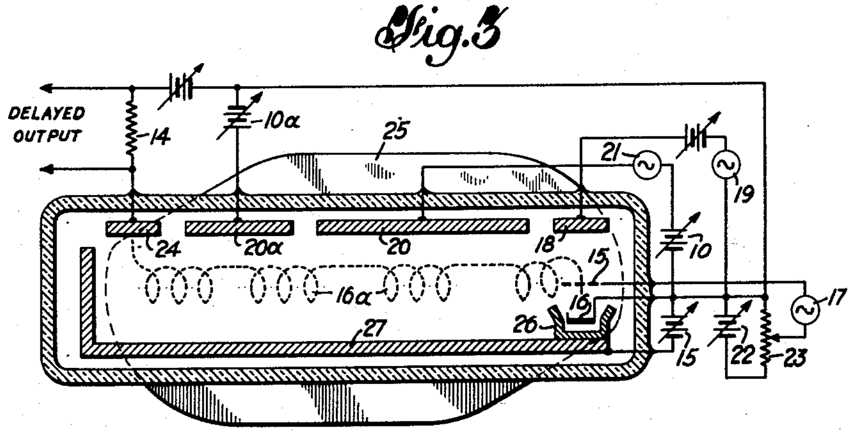
Fig. 3 illustrates a modification of the device shown in Fig. 1.

The sharpness of the electron stream may be improved by placing a focusing electrode 26 effectively between cathode 16 and electrode 18 as indicated in Fig. 3. The focusing electrode 26 is biased to a suitable potential, for example, by connecting it to the electrode 27.

It will be understood from the above that the invention is not limited to the specific exemplifications disclosed herein for illustration and that many modifications may be made without departing from the scope of the invention.

I claim:

1. An electronic device comprising a cathode source of electrons, a collector electrode disposed remote to said cathode source, means for directing said electrons continuously toward said collector electrode along a trochoidal path, means for modulating said electrons by an input signal, a load connected to said collector electrode for deriving an output signal corresponding to said input signal and having a delay depending on the total length of the trochoidal path, an anode adjacent said cathode, means for biasing said anode with respect to said cathode to cause electrons to deviate from said trochoidal path towards said anode, a source of signal voltage, and means for applying said signal voltage to said anode.

2. An electronic device comprising a cathode source of electrons, a collector electrode, means for directing said electrons continuously toward said collector electrode along a trochoidal path, means for modulating said electrons by an input signal, a load connected to said collector electrode for deriving an output signal corresponding to said input signal and having a delay depending on the total length of the trocoidal path, an anode adjacent said cathode, means for biasing said anode with respect to said cathode to cause electrons to deviate from said trochoidal path towards said anode, a source of signal voltage, means for applying said signal voltage to said anode, and a control grid interposed between said source of electrons and said collector electrode, means for biasing said grid with respect to said cathode, and means for applying a modulating signal to said grid.

3. An electronic device as defined in claim 1, and which further comprises electron focusing means interposed in the path of the electrons traveling from said cathode toward said collector electrode.

4. An electronic device comprising a cathode source of electrons, a collector electrode, means for directing said electrons continuously toward said collector electrode along a trochoidal path, means for modulating said electrons by an input signal, a load connected to said collector electrode for deriving an output signal corresponding to said input signal and having a delay depending on the total length of the trocoidal path, an anode adjacent said cathode, means for biasing said anode with respect to said cathode to cause electrons to deviate from said trochoidal path towards said anode, a source of signal voltage, and means for applying said signal voltage to said anode, said means for directing said electrons toward said collector electrode in a trochoidal path comprising means for establishing a magnetic field substantially perpendicular to the axis of the trochoidal path and means for establishing an electric field substantially perpendicular to said magnetic field and to the axis of said trochoidal path, said last named means comprising a pair of spaced elongated electrodes, means for biasing one of said elongated electrodes to a direct current potential which is negative with respect to said cathode, means for biasing the other of said elongated electrodes to a direct current potential which is positive with respect to said cathode and means for applying a signal to at least one of said elongated electrodes to vary the relative potential between said electrodes and thereby vary the strength of said electric field.

5. An electronic device as defined in claim 4, which further comprises means for varying the electric field along the path of said electrons between said cathode and said collector electrode.

6. An electronic device comprising a cathode; a collector electrode; a load connected to said collector electrode; means, including means for producing electric and magnetic fields, for causing electrons emitted by said cathode to travel in a circuitous path to said collector electrode; means for controlling the speed at which said electrons approach said collector electrode; a source of signal voltage; and means for modulating the electron stream travelling from said cathode toward said collector electrode with said signal voltage; said means for controlling the speed at which the electrons approach said collector electrode comprising an elongated electrode disposed on one side of the electron path, means for biasing said elongated electrode with respect to said cathode, a plurality of second elongated electrodes placed in juxtaposition with respect to the first named elongated electrode and on the opposite side of the electron path, means for biasing separately said plurality of second elongated electrodes with respect to said cathode and with a polarity opposite of that biasing said first named elongated electrode, and means for varying the biasing potential of at least one of said second electrodes.

7. An electronic device comprising a cathode; a collector electrode; a load connected to said collector electrode; means, including means for producing electric and magnetic fields, for causing electrons emitted by said cathode to travel in a circuitous path to said collector electrode; means for controlling the speed at which said electrons approach said collector electrode; a source of signal voltage; and means for modulating the electron stream travelling from said cathode toward said collector electrode with said signal voltage; said means for producing a magnetic field being arranged so as to produce a field which is non-homogeneous along the axis of said circuitous path.

8. An electronic device comprising a cathode; a collector electrode; a load connected to said collector electrode; means, including means for producing electric and magnetic fields, for causing electrons emitted by said cathode to travel in a circuitous path to said collector electrode; means for controlling the speed at which said electrons approach said collector electrode; a source of signal voltage; and means for modulating the electron stream travelling from said cathode toward said collector electrode with said signal voltage; said means for producing an electric field being arranged to produce a field which is non-homogeneous along the axis of said circuitous path.

9. An electronic device comprising a cathode; a collector electrode; means, including means for producing electric and magnetic fields, for causing an electron stream emitted by said cathode to travel in a trochoidal path to said collector electrode; a source of voltage having a given periodicity; means for modulating the intensity of said electron stream in accordance with said periodic voltages, said means for modulating the intensity of the electron stream including an anode juxtaposed to said cathode; means for varying the transit time of the electrons in accordance with a signal; and load means connected to said collector electrode for deriving output voltages having said given periodicity modulated in accordance with said signal.

10. An electronic device as defined in claim 9 wherein the means for modulating the intensity of the electron stream further includes a control grid adjacent the cathode.

11. An electronic device comprising a cathode; a collector electrode; means, including means for producing electric and magnetic fields, for causing an electron stream emitted by said cathode to travel in a trochoidal path to said collector electrode; means for modulating the intensity of the electron stream in accordance with a first signal and means for modulating the transit time of the electrons according to a second signal, whereby a mixing of the two signals is obtained, said intensity modulation means including a grid and the transit time modulating means including means for modulating the intensity of an electric field along the path of electron flow.

References Cited in the file of this patent

UNITED STATES PATENTS

| | | |
|---|---|---|
| 2,372,210 | Labin | Mar. 27, 1945 |
| 2,456,466 | Sunstein | Dec. 14, 1948 |
| 2,530,373 | Bowen | Nov. 21, 1950 |
| 2,553,566 | Ferguson | May 22, 1951 |
| 2,565,410 | Tiley | Aug. 21, 1951 |